United States Patent
Wang et al.

(10) Patent No.: US 8,094,938 B2
(45) Date of Patent: Jan. 10, 2012

(54) APPARATUS AND METHOD FOR HANDWRITING RECOGNITION

(75) Inventors: Kong Qiao Wang, Beijing (CN); Ying Liu, Beijing (CN); Yanming Zou, Beijing (CN); Yi pu Gao, Beijing (CN); Jari A. Kangas, Tampere (FI)

(73) Assignee: Nokia Corporation (FI)

( * ) Notice: Subject to any disclaimer, the term of this patent is extended or adjusted under 35 U.S.C. 154(b) by 1281 days.

(21) Appl. No.: 11/547,066

(22) PCT Filed: Apr. 2, 2004

(86) PCT No.: PCT/IB2004/001017
§ 371 (c)(1),
(2), (4) Date: May 8, 2007

(87) PCT Pub. No.: WO2005/096217
PCT Pub. Date: Oct. 13, 2005

(65) Prior Publication Data
US 2008/0166049 A1    Jul. 10, 2008

(51) Int. Cl.
*G06K 9/00* (2006.01)
*G06K 9/18* (2006.01)
*G06F 3/041* (2006.01)

(52) U.S. Cl. ........ 382/185; 382/187; 382/189; 382/312; 345/173

(58) Field of Classification Search .......... 382/181–190, 382/137, 312; 345/173, 169, 156, 418; 235/435
See application file for complete search history.

(56) References Cited

U.S. PATENT DOCUMENTS 5,121,442 A * 6/1992 Togawa et al. ................ 382/189
5,212,769 A * 5/1993 Pong ............................. 345/467
(Continued)

FOREIGN PATENT DOCUMENTS
EP    1475741 B1 * 12/2005
(Continued)

OTHER PUBLICATIONS

Jaeger et al. "The state of the art in Japanese online handwriting recognition compared to techniques in western handwriting recognition" IJDAR (2003) 6:75-88.*
(Continued)

*Primary Examiner* — Jason M Repko
*Assistant Examiner* — Mia M Thomas
(74) *Attorney, Agent, or Firm* — Banner & Witcoff, Ltd.

(57) ABSTRACT

An apparatus (100) for handwriting recognition has a touch-sensitive display screen (240) providing a hand writing input area (270) capable of detecting hand-made user input. The apparatus also has a processing device (300) coupled to the touch-sensitive display screen and providing a user interface to a user. The handwriting input area (270) includes a writing start area (280) capable of switching between a first two-dimensional scope (282) and a second two-dimensional scope (282'), larger than the first two-dimensional scope. The processing device (300) is configured to handle said hand-made user input as either a logical mouse event, associated with a control operation for said user interface, or a logical pen event, associated with handwriting. User input within the writing start area when having its first two-dimensional scope is handled as a logical mouse event and causes the writing start area to switch to its second two-dimensional scope, Furthermore, user input that starts within the writing start area when having its second two-dimensional scope is handled as a logical pen event and causes interpretation of the user input (252) as a symbol (254) from a plurality of predefined symbols.

23 Claims, 7 Drawing Sheets

U.S. PATENT DOCUMENTS

| | | | |
|---|---|---|---|
| 5,265,251 A * | 11/1993 | Agarawal et al. | 713/100 |
| 5,502,461 A * | 3/1996 | Okamoto et al. | 345/173 |
| 5,655,136 A | 8/1997 | Morgan | |
| 5,778,404 A | 7/1998 | Capps et al. | |
| 5,864,636 A * | 1/1999 | Chisaka | 382/189 |
| 6,002,799 A * | 12/1999 | Sklarew | 382/189 |
| 6,005,973 A * | 12/1999 | Seybold et al. | 382/187 |
| 6,049,329 A * | 4/2000 | Zetts et al. | 345/179 |
| 6,075,469 A * | 6/2000 | Pong | 341/28 |
| 6,088,481 A * | 7/2000 | Okamoto et al. | 382/189 |
| 6,188,789 B1 * | 2/2001 | Marianetti et al. | 382/189 |
| 6,240,444 B1 * | 5/2001 | Fin et al. | 709/205 |
| 6,424,743 B1 * | 7/2002 | Ebrahimi | 382/189 |
| 6,438,523 B1 * | 8/2002 | Oberteuffer et al. | 704/270 |
| 6,462,941 B1 * | 10/2002 | Hulick et al. | 361/679.24 |
| 6,493,464 B1 * | 12/2002 | Hawkins et al. | 382/189 |
| 6,545,669 B1 * | 4/2003 | Kinawi et al. | 345/173 |
| 6,567,549 B1 * | 5/2003 | Marianetti et al. | 382/189 |
| 6,633,672 B1 * | 10/2003 | Guzik et al. | 382/189 |
| 6,661,409 B2 | 12/2003 | Demartines et al. | |
| 6,724,370 B2 * | 4/2004 | Dutta et al. | 345/169 |
| 6,834,195 B2 * | 12/2004 | Brandenberg et al. | 455/456.3 |
| 6,839,464 B2 | 1/2005 | Hawkins et al. | |
| 6,970,599 B2 * | 11/2005 | Longe et al. | 382/185 |
| 7,002,560 B2 | 2/2006 | Graham | |
| 7,093,034 B2 * | 8/2006 | Need | 710/33 |
| 7,113,173 B1 * | 9/2006 | Bi et al. | 345/169 |
| 7,113,178 B1 | 9/2006 | Webb | |
| 7,292,226 B2 * | 11/2007 | Matsuura et al. | 345/168 |
| 7,295,206 B2 * | 11/2007 | Lin | 345/467 |
| 7,408,537 B2 * | 8/2008 | O'Dell | 345/171 |
| 7,538,771 B2 * | 5/2009 | Nakamura et al. | 345/467 |
| 7,580,029 B2 * | 8/2009 | Liu et al. | 345/169 |
| 7,597,262 B2 * | 10/2009 | Wang et al. | 235/462.09 |
| 7,728,818 B2 * | 6/2010 | Yu et al. | 345/172 |
| 7,924,266 B2 * | 4/2011 | Larsen | 345/163 |
| 2002/0027550 A1 * | 3/2002 | Frink et al. | 345/179 |
| 2002/0114516 A1 * | 8/2002 | Aharonson | 382/181 |
| 2002/0163511 A1 * | 11/2002 | Sekendur | 345/179 |
| 2002/0168107 A1 * | 11/2002 | Tang et al. | 382/187 |
| 2002/0190957 A1 | 12/2002 | Lee et al. | |
| 2003/0116873 A1 | 6/2003 | Ayyagari et al. | |
| 2003/0144761 A1 * | 7/2003 | Basson et al. | 700/175 |
| 2003/0156099 A1 * | 8/2003 | Yrjanainen et al. | 345/173 |
| 2004/0017946 A1 * | 1/2004 | Longe et al. | 382/185 |
| 2004/0036680 A1 * | 2/2004 | Davis et al. | 345/169 |
| 2004/0196266 A1 * | 10/2004 | Matsuura et al. | 345/169 |
| 2004/0215743 A1 * | 10/2004 | Cook et al. | 709/217 |
| 2004/0223647 A1 * | 11/2004 | Blount et al. | 382/189 |
| 2004/0263486 A1 * | 12/2004 | Seni | 345/173 |
| 2005/0007344 A1 * | 1/2005 | Cook et al. | 345/163 |
| 2005/0057520 A1 | 3/2005 | Robinson | |
| 2005/0108439 A1 * | 5/2005 | Need | 710/1 |
| 2005/0122322 A1 * | 6/2005 | Furuya et al. | 345/418 |
| 2005/0152600 A1 * | 7/2005 | Chen et al. | 382/187 |
| 2005/0210419 A1 * | 9/2005 | Kela et al. | 715/863 |
| 2005/0219226 A1 * | 10/2005 | Liu et al. | 345/173 |
| 2005/0222838 A1 * | 10/2005 | Gong | 704/5 |
| 2005/0276480 A1 * | 12/2005 | Li et al. | 382/185 |
| 2006/0109262 A1 * | 5/2006 | Yeh | 345/179 |
| 2006/0245081 A1 * | 11/2006 | Mahony | 359/726 |
| 2006/0279559 A1 * | 12/2006 | Kongqiao et al. | 345/179 |
| 2007/0013767 A1 * | 1/2007 | Wang et al. | 348/14.01 |
| 2007/0018970 A1 * | 1/2007 | Tabasso et al. | 345/184 |
| 2007/0075976 A1 * | 4/2007 | Kun et al. | 345/172 |
| 2008/0002888 A1 * | 1/2008 | Yuan | 382/187 |
| 2008/0025610 A1 * | 1/2008 | Abdulkader | 382/185 |
| 2008/0166049 A1 * | 7/2008 | Wang et al. | 382/189 |
| 2009/0265669 A1 * | 10/2009 | Kida et al. | 715/863 |
| 2011/0106523 A1 * | 5/2011 | Maeda et al. | 704/2 |

FOREIGN PATENT DOCUMENTS

| | | |
|---|---|---|
| GB | 2313993 | 12/1997 |
| JP | 59 075376 | 4/1984 |
| JP | 61243582 | 10/1986 |

OTHER PUBLICATIONS

Leopold et al. "Keyboardless Visual Programming Using Voice, Handwriting and Gesture" IEEE (1997) pp. 28-35.*

Liu et al. "Predicting Chinese Text Entry Speeds on Mobile Phones" CHI 2010: HCI in China Apr. 2010 (Atlanta, GA) pp. 1-10.*

Patent Abstracts of Japan, vol. 0081, No. 83, (P-296), Aug. 23, 1984.

* cited by examiner

APPARATUS AND METHOD FOR HANDWRITING RECOGNITION

This is a U.S. national stage of PCT/IB2004/001017, filed on Apr. 2, 2004, the contents of which are incorporated by reference herein.

FIELD OF THE INVENTION

The present invention relates to electronic hand-writing equipment, and more particularly to an apparatus for handwriting recognition having a touch-sensitive display screen that provides a handwriting input area capable of detecting hand-made user input, and a processing device configured to interpret the handwritten user input as a symbol from a plurality of predefined symbols. The invention also relates to a method for handwriting recognition.

BACKGROUND OF THE INVENTION

Examples of electronic handwriting equipment include portable/personal assistants (PDAs), palmtop computers and mobile telecommunication terminals (mobile phones). They have in common that they make use of a stylus and a touch-sensitive display screen, a solution that offers improved usability and flexibility compared to conventional user interfaces with a keypad or keyboard.

In an apparatus that relies primarily on a stylus and a touch-sensitive display screen for user input, the the stylus plays two roles; sometimes it works like a normal pen for writing and sometimes like a mouse for controlling the user interface. How to detect which role the pen is taking is important for reasons of efficiency, usability as well as accuracy.

In this document, when the real physical stylus works as a normal pen is referred to as a "logical pen" mode. Conversely, when the stylus works like a normal mouse in a computerized user interface is referred to as a "logical mouse" mode.

A stylus-based user interface can receive three kinds of events from a physical stylus, as detected by the touch-sensitive display screen: pen down, pen move and pen up. Each event has two common properties: the happening position and the time of the event. These three kinds of events form event circles like "pen down->pen move(s)->pen up". There should be one pen down at the beginning of the event circle and one pen up at the end of the circle. The number of pen moves, however, can be any from 0 to virtually infinite.

When the stylus works as a logical pen, a grahical pen trace of the pen event circle is presented on the display screen. The pen traces are removed from the display screen when they make up and have been recognized as a complete symbol.

When the stylus works as a logical mouse, no trace is presented on the screen. However, objects or control elements such as buttons, icons and menu options on the display screen can be selected and operated by the stylus.

How to distinguish whether an event circle belongs to a logical pen mode or a logical mouse mode has been solved in the prior art in two different ways.

A first solution, which is illustrated in FIG. 4, is based on spatial information. The basic rules are:

When the pen is operated in a special area, this event is recognized as an event of a logical pen.

Otherwise, it is recognized as a logical mouse event.

The special area is normally called a writing area and is of limited size compared to the entire available area of the touch-sensitive display screen.

U.S. Pat. No. 6,567,549, in FIG. 7 thereof, illustrates the user interface of a palmtop computer, where the display has different limited writing areas, referred to as character input boxes 710, 760, 750. An important drawback of this solution is that it reserves a part of the display screen as special writing area, which cannot be used for other purposes. This special area cannot be too small since it must be able to contain the handwriting of characters and symbols. Particularly in mobile phones and other similar miniaturized devices, this becomes a serious problem, since the display screens of mobile phones are usually very small and the display screens must be used also for other purposes than receiving handwriting, namely for presenting both information and objects such as control elements of the user interface.

A second solution, which is illustrated in FIG. 5, is based on temporal information. Basically, for the following cases, the stylus will be recognized as a logical pen:

When there are one or more pen traces on the screen (step 510).

When there is no pen trace on the screen, the event circle contains at least one pen move event (step 520), and the duration $T_e$ between the pen down event and the first pen move event is less than a threshold $T_s$ (step 530).

For other cases, the stylus is considered as a logical mouse. Those cases can be concluded as follows:

When there is no pen trace on the screen and the event circle does not contain a pen move event.

When there is no pen trace on the screen, the event circle contains at least one pen move event but the duration $T_e$ between the pen down event and the first pen move event is not less than a threshold $T_s$.

Normally the threshold $T_s$ is very small, for example 0.5 seconds.

An important drawback of this solution is that it is not particularly friendly to users. For example, a small wobble of hand can accidentally change the meaning of actions. Thus, the rate of wrong actions could be rather high, especially in moving environments, like in a vehicle. It is particularly difficult to discriminate an intended pen-down event (logical mouse) from a very short writing event (logical pen), since in a moving environment the stylus may slide slightly when applying a pen-down, thereby strongly resembling a short writing event.

Another problem with known electronic handwriting equipment is how to handle different symbol sets (or character sets). The accuracy of the handwriting recognition is generally better for restricted symbol sets with a smaller number of symbols than for symbol sets with a larger number of symbols. Thus, Latin letters are normally included in one symbol set (or in fact often two; upper case and lower case), Arabic numerals in another, Chinese characters in yet another, etc. The prior art generally suggests three different ways of selecting a desired symbol set for handwriting recognition:

1. Selecting a menu option in a graphical user interface.
2. Selecting/tapping a symbol set mode icon.
3. Writing a special symbol set control stroke that will restrict the interpretation of succeeding (or preceding) stylus strokes to a particular symbol set.

U.S. Pat. No. 6,567,549, which has been referred to above, is an example of solution 2. The leftmost character input box 710 is for inputting Japanese Kanji symbols, and the rightmost box 750 is for Arabic numerals. The center box 760 is a combined input box for inputting Japanese Hiragana characters, Japanese Katakana characters or Western Roman characters depending on the current input mode. The current input mode for the center box 760 is selected by the user by tapping the stylus on a corresponding Hiragana, Katakana or Roman mode box, these mode boxes being provided as graphical icons adjacently to the character input boxes.

All three of the above solutions have a common drawback in that they require an extra action from the user to select the desired symbol set. This is both inconvenient and will slow down the speed of handwriting input.

SUMMARY OF THE INVENTION

In view of the above, an objective of the invention is to solve or at least reduce the problems discussed above. In more particular, a purpose of the invention is to provide an improved manner of discriminating between logical pen mode and logical mouse mode that reduces the risk of confusing logical-mouse pen-down events with short logical-pen writing events. A further purpose is to provide handwriting recognition with improved accuracy in a moving environment. Another purpose is to facilitate switching between different symbol sets for the handwriting recognition.

Generally, the above objectives and purposes are achieved by a apparatus and a method for handwriting recognition according to the attached independent patent claims.

A first aspect of the invention is an apparatus for handwriting recognition, the apparatus comprising:

a touch-sensitive display screen providing a handwriting input area capable of detecting hand-made user input, and a processing device coupled to the touch-sensitive display screen and providing a user interface to a user.

The handwriting input area includes a writing start area capable of switching between a first two-dimensional scope and a second two-dimensional scope, larger than the first two-dimensional scope, and the processing device is configured to handle said hand-made user input as either a logical mouse event, associated with a control operation for said user interface, or a logical pen event, associated with handwriting, wherein user input within the writing start area when having its first two-dimensional scope is handled as a logical mouse event and causes the writing start area to switch to its second two-dimensional scope, and wherein user input that starts within the writing start area when having its second two-dimensional scope is handled as a logical pen event and causes interpretation of the user input as a symbol from a plurality of predefined symbols.

As used herein, "hand-made user input" means a stroke, or a sequence of successive strokes entered within short time intervals, made onto the touch-sensitive display screen by way of a pen, stylus or any pen-like object including a user's finger or other body part. Such strokes are referred to as "pen strokes" in the remainder of this document. The pen stroke may consist of a pen down event followed by pen move event(s) and a pen up event, or may consist of merely a pen down event followed by a pen up event.

Thus, to commence handwriting input, the user may select the writing start area by tapping on the display screen anywhere within the writing start area, whereupon the writing start area will switch to its larger second two-dimensional scope, The user will then have a larger area, i.e. the enlarged writing start area, to begin writing each symbol in. This is particularly advantageous in a non-stable environment where the apparatus may be. subjected to shakings and other movements. Advantageously, the first two-dimensional scope may have a given geometrical shape and a given size, such as a square or rectangular box, and the second two-dimensional scope may be an enlarged or expanded version of this geometrical shape in a larger size. Only if the pen stroke, or the first pen stroke in a sequence of successive strokes, starts within the writing start area will the processing device perform interpretation of the user input as a symbol. As previously mentioned, this may be referred to as logical pen mode.

It is to be observed that the pen stroke, or the sequence of successive strokes, need not end within the writing start area but may on the contrary end anywhere within the handwriting input area, which advantageously is much larger than the writing start area and which may occupy a majority of the display screen or even essentially the entire display screen.

Therefore, the invention provides a more accurate discrimination between logical pen mode and logical mouse mode and at the same time offers plenty of writing space, since the handwriting only needs to start but not end within the writing start area. As a result improved usability as well as faster handwriting input is facilitated.

If the user input instead starts outside of said writing start area, the processing device may be configured to interpret the user input as a control operation for the user interface, e.g. a selection of a menu item, a selection of a graphical object such as a clickable button, check box or pop-up/pull-down field, a moving action for such an object, etc. Therefore, the handwriting input area, except for the part that contains the writing start area, will serve both as an area where selectable control elements for the user interface are accessible, and as an area for receiving handwriting. Thus, efficient use is made of the available presentation area of the display.

In one embodiment the user input, which is required within the writing start area when having its first two-dimensional scope so as to cause the writing start area to switch to its second two-dimensional scope, includes a pen down event followed by a pen up event, i.e. the user will first have to make a selection of the writing start area by tapping and lifting the stylus, whereupon the writing start area will expand and handwriting can start by applying the stylus once again onto the display screen. In another embodiment, though, the required user input for causing a switch to the second two-dimensional scope includes only a pen down event, wherein the writing start area will expand directly and handwriting can start without lifting the stylus, i.e. the user will be able to point at the writing start area and directly continue with writing a stroke from the point where the stylus was applied.

In one embodiment, the plurality of predefined symbols includes a first symbol set and a second symbol set, and said writing start area comprises a first subarea and a second subarea, each being capaple of switching between a first two-dimensional scope and a second two-dimensional scope, larger than the first two-dimensional scope, wherein user input within either of said first subarea and second subarea, when having its respective first two-dimensional scope, is handled as a logical mouse event and causes a switch to its second two-dimensional scope. User input that starts within said first subarea, when having its second two-dimensional scope, is handled as a logical pen event and causes interpretation of the user input as a symbol from said first symbol set, and user input that starts within said second subarea, when having its second two-dimensional scope, is handled as a logical pen event and causes interpretation of the user input as a symbol from said second symbol set. Preferably, a switch to the second two-dimensional scope for either of said first subarea or second subarea causes a switch for the other one of said first subarea or second subarea to its first two-dimensional scope, if not already having it, so that maximum only one of said first and second subareas can have its second two-dimensional scope at any given time. This embodiment provides efficient and reliable handwriting recognition for users that require more than one symbol set. In variations of this embodiment, the writing start area may have a third subarea, or even further subareas, that is/are associated with a third symbol set, and further subareas, respectively.

Advantageously, the writing start area is considerably smaller than and has a fixed location within the handwriting input area. For instance, the writing start area may be shown as a little square or rectangular box with a different visual appearance than that of the background/handwriting input area, e.g. another color, grayscale tone or pattern. Such a little box may be included in a menu or status bar that anyway is included in the user interface for other reasons, such as for presenting status information and/or menus and menu options.

Alternatively, the writing start area may have an adaptive location within said handwriting input area, wherein the processing device will be configured to adjust the adaptive location depending on a current cursor position. Advantageously, in this way the writing start area will each moment have a location that is near the display location where the user currently uses, or is likely to use, his stylus. As an alternative, the adaptive location may be adjustable by the user of the apparatus, e.g. so that it will depend on a user preference setting.

The processing device may be configured to display, on the display screen, a graphical trace representing a pen stroke prior to the interpretation thereof. Moreover, the processing device may be configured to display, on the display screen, the symbol when it has been interpreted from the pen stroke.

The plurality of predefined symbols may include a symbol set selected from the group consisting of: Latin characters, upper case characters, lower case characters, Arabic numerals, punctuation symbols, Cyrillic characters, Chinese characters, Japanese Kanji symbols, Japanese Hiragana characters and Japanese Katakana characters, and user-defined symbols.

The processing device advantageously includes or cooperates with a handwriting recognition engine which may be implemented as hardware, software or any combination thereof.

The apparatus may be a mobile terminal for a mobile telecommunications system, such as GSM, UMTS, D-AMPS or CDMA2000, or a portable/personal digital assistant (PDA), or another type of similar device.

A second aspect of the invention is a method for handwriting recognition in an apparatus that has a touch-sensitive display screen with a handwriting input area capable of detecting hand-made user input. The method comprises the steps of:

providing, within said handwriting input area, a writing start area capable of switching between a first two-dimensional scope and a second two-dimensional scope, larger than the first two-dimensional scope;

detecting user input within the writing start area;

handling said user input, when said writing start area has its first two-dimensional scope, as a logical mouse event and in response switching the writing start area to its second two-dimensional scope; and handling said user input, when said writing start area has its second two-dimensional scope and said user input starts within the writing start area, as a logical pen event and in response interpreting said user input as a symbol from a plurality of predefined symbols. The second aspect has generally the same features and advantages as the first aspect.

Other objectives, features and advantages of the present invention will appear from the following detailed disclosure, from the attached dependent claims as well as from the drawings.

BRIEF DESCRIPTION OF THE DRAWINGS

The present invention will now be described in more detail, reference being made to the enclosed drawings, in which.

DETAILED DESCRIPTION OF THE INVENTION

A telecommunications system in which the present invention may be applied will first be described with reference to FIG. 1. Then, the particulars of the apparatus and method according to embodiments of the invention will be described with reference to the remaining FIGS.

Figure 1:
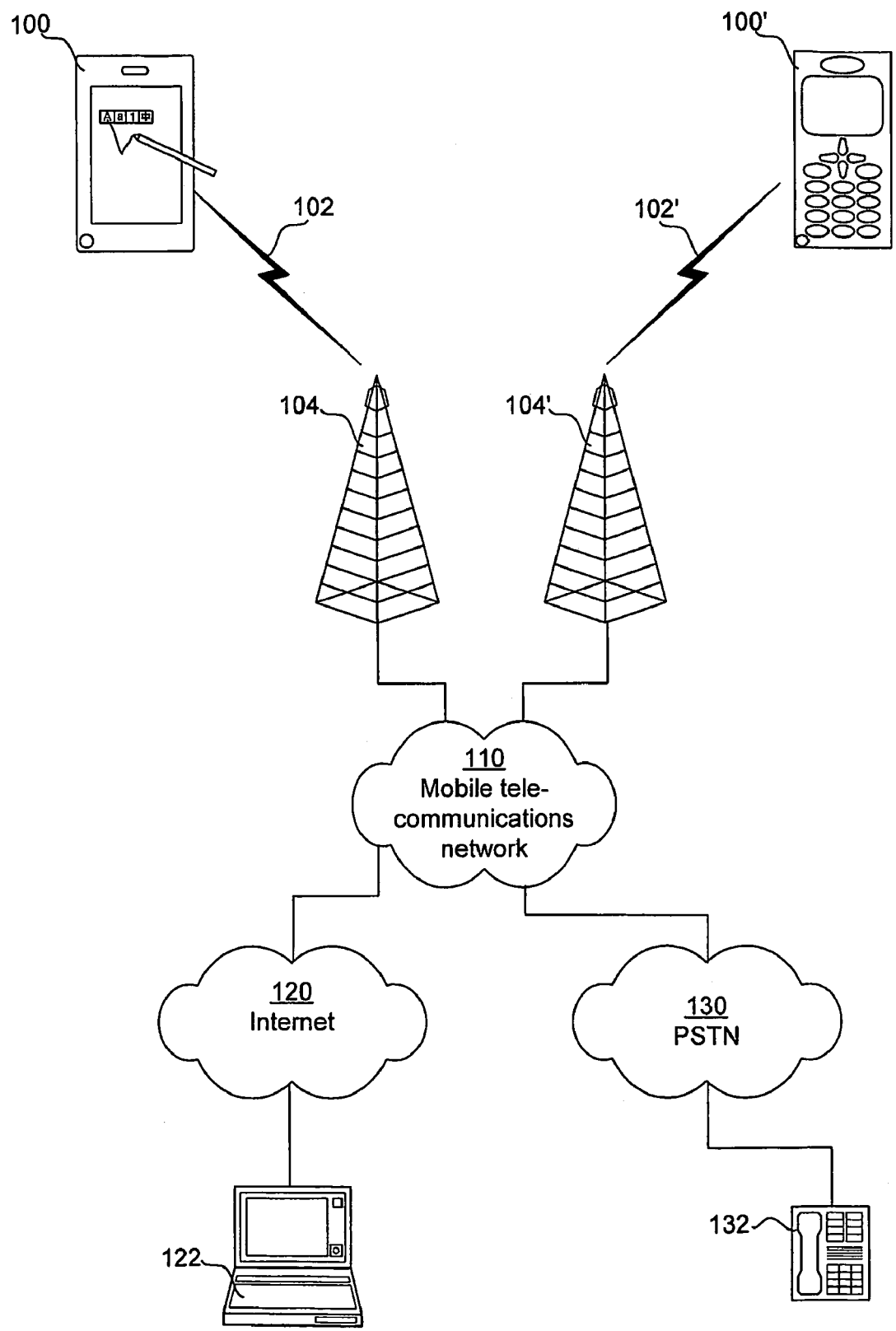
FIG. 1 is a schematic illustration of a telecommunications system, including a portable communication apparatus in the form of a mobile terminal, as an example of an environment in which the present invention may be applied.

In the telecommunications system of FIG. 1, various telecommunications services such as voice calls, data calls, facsimile transmissions, music transmissions, still image transmissions, video transmissions, electronic message transmissions and electronic commerce may be performed by way of a portable communication apparatus or mobile terminal 100. The apparatus 100 is connected to a mobile telecommunications network 110 through an RF link 102 via a base station 104, as is well known in the art. The mobile telecommunications network 110 may be any commercially available mobile telecommunications system, such as GSM, UMTS, D-AMPS or CDMA2000. The apparatus 100 is illustrated as a mobile (cellular) telephone but may alternatively be another kind of portable device, such as a portable/personal digital assistant (PDA) or a communicator. As will be explained in more detail with reference to FIG. 2, the apparatus 100 has a stylus-operated user interface including a touch-sensitive display screen onto which a user may enter handwritten information as well as operational commands by way of a stylus, pen or similar tool.

In the illustrated example, the apparatus 100 may be used for speech communication with users of other devices. Hence, speech may be communicated with a user of a stationary telephone 132 through a public switched telephone network (PSTN) 130 and the mobile telecommunications network 110, and with a user of another mobile terminal 100' which is connected to the mobile telecommunications network 110 over a wireless communication link 102'.

The mobile telecommunications network 110 is operatively connected to a wide area network 120, which may be Internet or a part thereof. Thus, the apparatus 100 may access a computer 122 connected to the wide area network 120 in accordance with specified protocols (such as TCP, IP and HTTP) and appropriate application software (such as a WAP or WWW browser, an email or SMS application, etc) in the apparatus 100.

The system illustrated in FIG. 1 serves exemplifying purposes only.

Figure 2A:
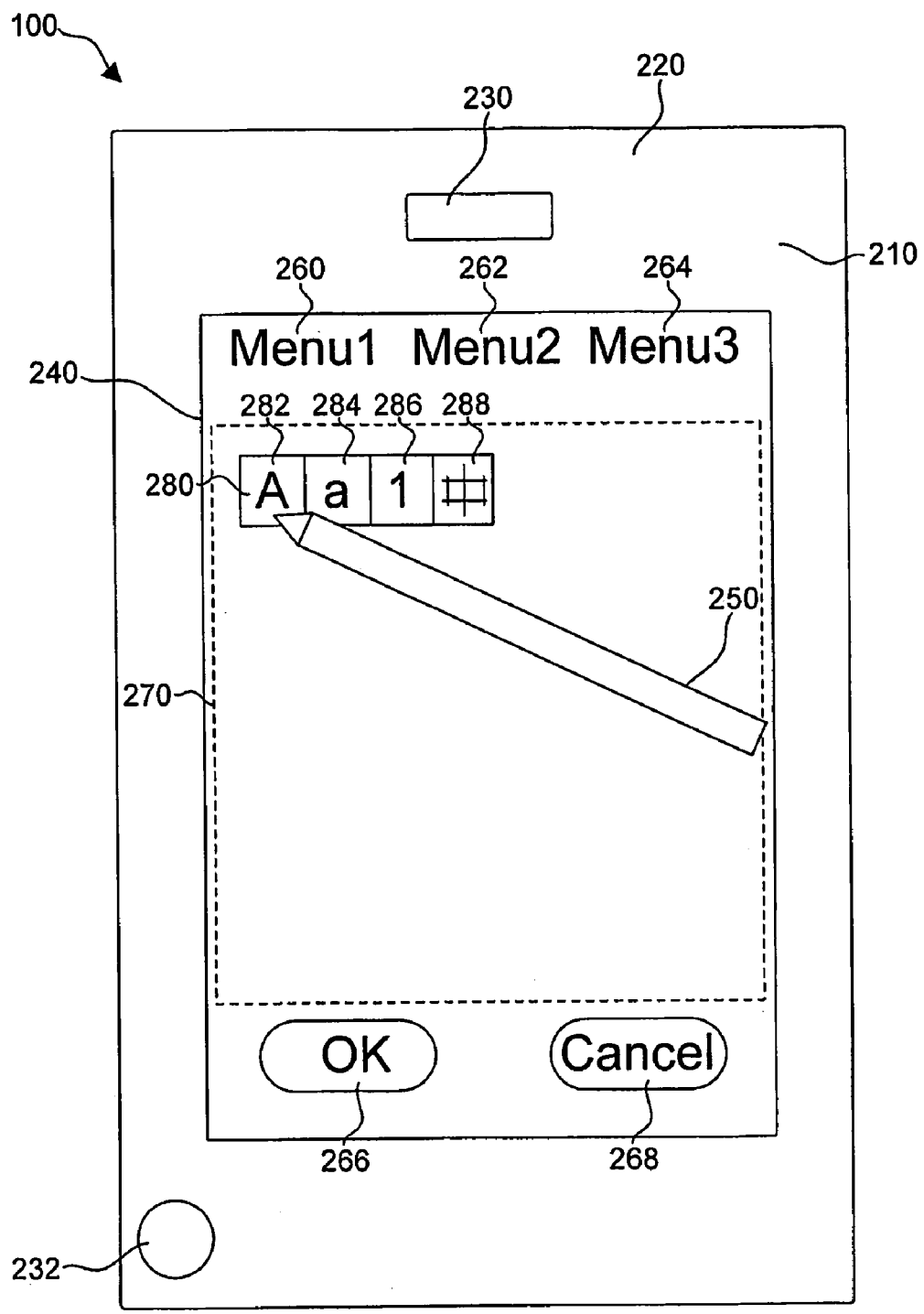
FIG. 2a is a schematic front view of the mobile terminal of FIG. 1, illustrating in more detail its user interface which includes a touch-sensitive display screen for operation by way of a pen, stylus or similar tool.

FIG. 2a illustrates the apparatus 100 of FIG. 1 in more detail. The apparatus 100 has an apparatus housing 210. A front surface 220 of the portable communication apparatus 100 has a speaker 230, a microphone 232 and a touch-sensitive display screen 240. As is well known in the art, the touch-sensitive display screen 240 constitutes not only an output device for presenting visual information to the user, but also an input device.

In more particular, by pointing, tapping or dragging a stylus 250 on the display screen 240, the user may use the stylus 250 as a logical mouse to control the user interface of the apparatus 100 by e.g. scrolling and selecting in different menus 260, 262, 264 and their menu options, setting the position of a cursor 256 on the display screen 240, selecting different selectable elements such as icons or click buttons 266, 268, etc.

Moreover, the stylus 250 may be used as a logical pen to enter handwritten information within a handwriting input area 270. In the embodiment of FIG. 2a, the handwriting input area 270 is indicated as a dashed rectangle and occupies a majority of the available presentation area of the display screen 240. The handwritten information may be entered into various software applications, such as a messaging application (email, SMS, MMS), a calendar application, a contacts application, etc. The handwritten input must start within a handwriting start area 280 for it to be processed by a handwriting recognition engine as a symbol out of a predefined symbol set. FIGS. 2b-g illustrate how a symbol 252 is being written in the form of at least one pen stroke with the stylus 250 on the display screen. A graphical trace is presented on the display screen to represent the handwritten input. When a complete pen stroke, or a sequence of pen strokes written at short time intervals, has been written, the handwriting recognition engine in the apparatus 100 will start interpreting the handwritten input to identify a symbol, out of a predefined symbol set, that best matches the handwritten input. After successful interpretation, the recognized symbol is presented in "plain text" at the cursor 256 and replaces the graphical trace 252.

In FIG. 2a, the apparatus 100 is in its logical mouse mode and accepts only mouse events, i.e. all hand-made input will be interpreted as a control operation for the user interface and not as handwriting to be recognized as a symbol. As seen in FIG. 2a, the writing start area 280 is divided into four subareas 282-288, that represent the following respective symbol sets: upper-case Latin letters, lower-case Latin letters, Arabic numerals and Chinese characters. In FIG. 2a, all subareas 282-288 have their first, smaller scope in the form of small boxes.

Figure 2B:
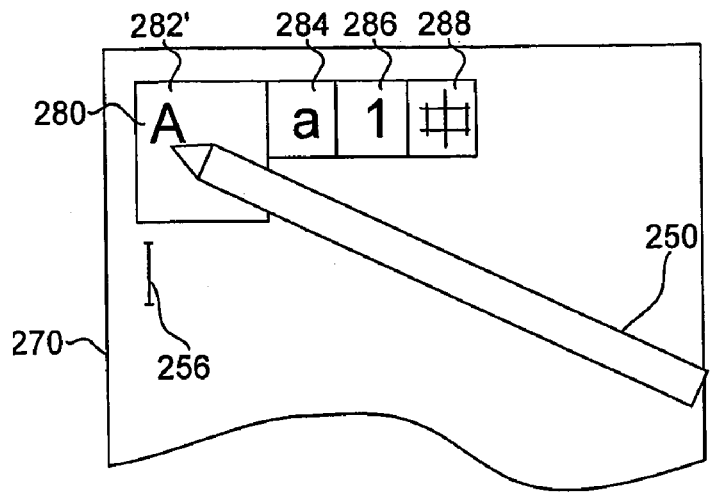
FIG. 2b-g schematically illustrate how handwriting is performed and different symbol sets are selected according to one embodiment.
Figure 2C:
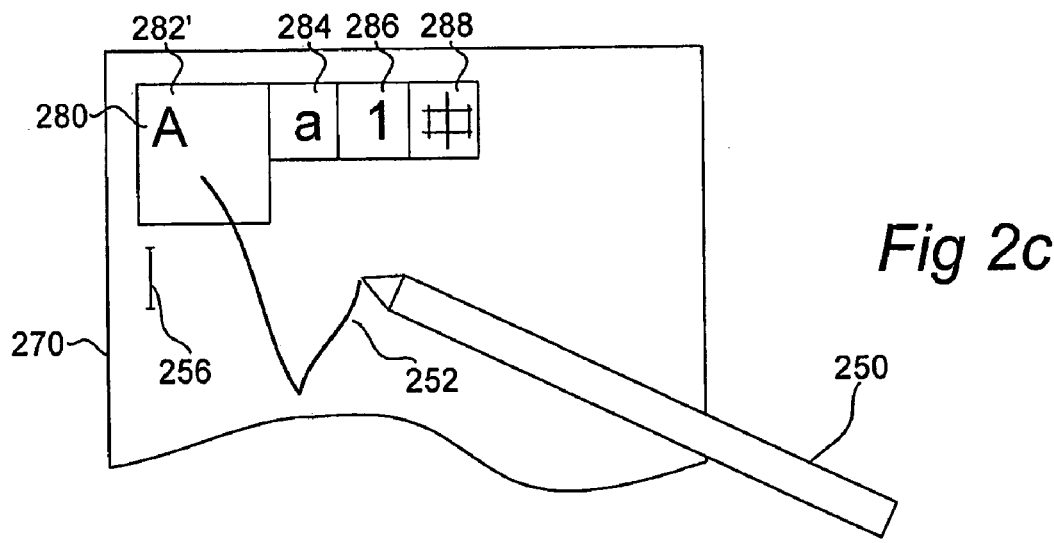

When the user wants to start handwriting, he may select the desired symbol set by tapping within the corresponding one of the subareas 282-288, i.e. by applying a logical-mouse pen-down. In FIG. 2a, the user thus selects subarea 282 for upper-case Latin letters, wherein this subarea will expand to its second, larger scope 282', as seen in FIG. 2b. Now, the apparatus 100 is in its logical pen mode, in which the enlarged subarea 282' of the writing start area 280 will accept writing events only, whereas the remainder of the handwriting input area 270, including the other subareas 284-288, will accept both mouse events and writing events. As seen further in FIGS. 2c-d, the apparatus 100 accepts a pen stroke 252 that starts within the enlarged subarea 282' but ends outside of it. Hence, the handwriting recognition engine will be called upon to interpret the pen stroke 252 as a symbol 254, namely capital "W" in FIG. 2d.

Figure 2D:
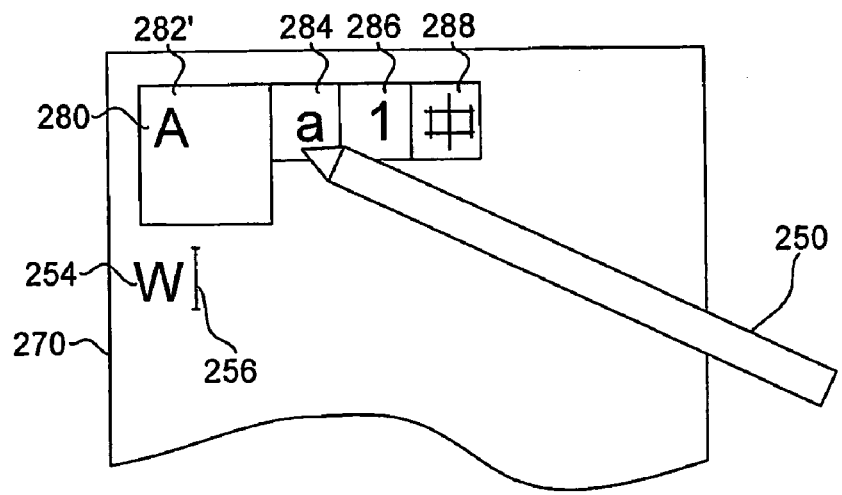
Figure 2E:
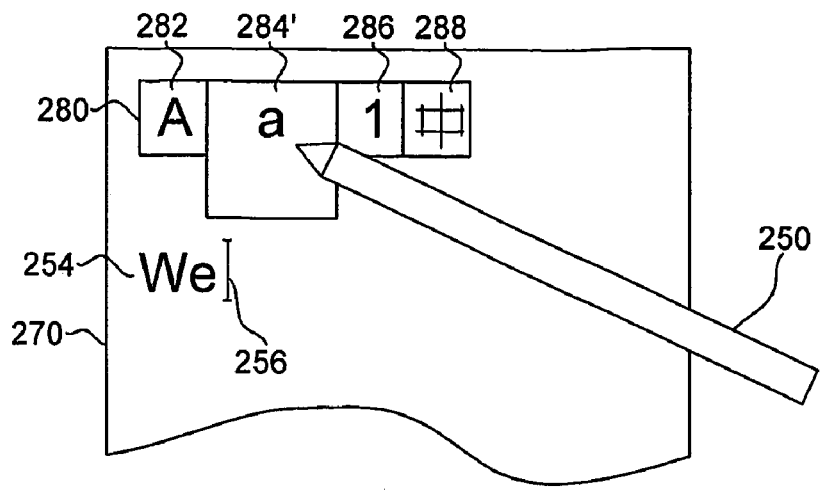
Figure 2F:
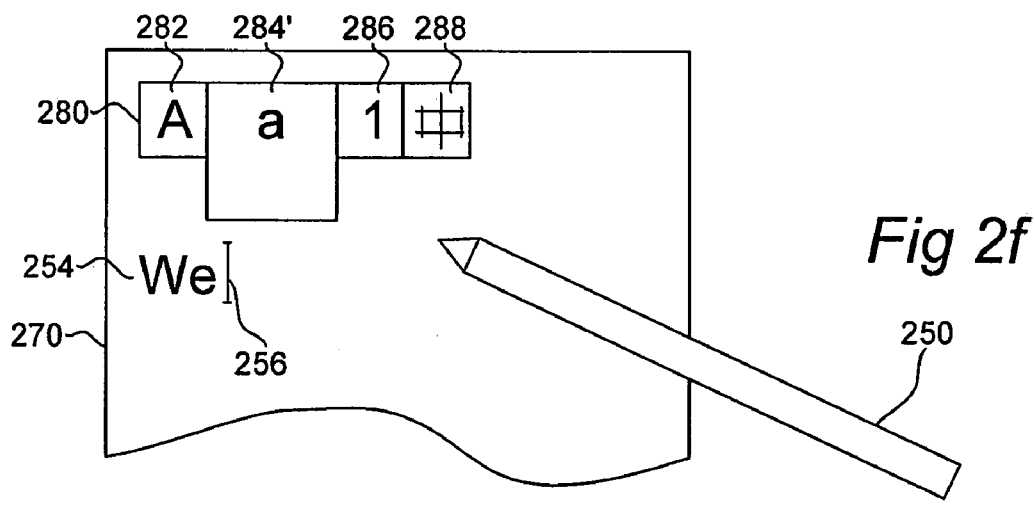
Figure 2G:
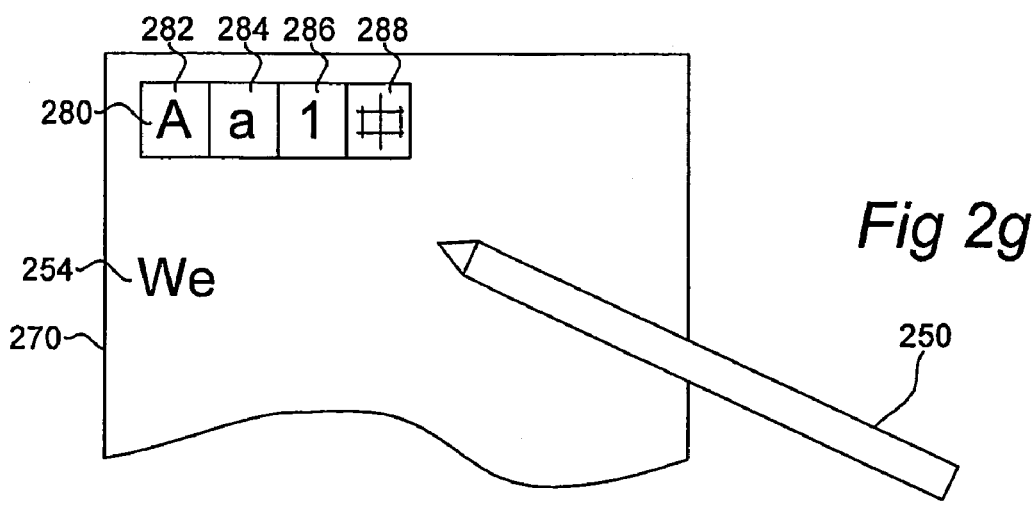

Next, as seen in FIG. 2d, the user wants to write lower-case Latin letters and therefore selects the corresponding subarea 284 of the writing start area 280. The apparatus remains in logical pen mode, but the formerly selected subarea 282' is reduced to its smaller size 282, whereas the now selected subarea 284 is enlarged, as seen at 284' in FIG. 2e. Now, the subarea 284' will accept writing events only, whereas the remainder of the handwriting input area 270, including the other subareas 282, 286 and 288, will accept both mouse events and writing events. After having written a lower-case "e", as seen in FIG. 2e, if the user wants to stop handwriting and return to the logical mouse mode, he may do this by applying a pen-down anywhere outside of the writing start area 280 and within the handwriting input area 270.

Figure 6:
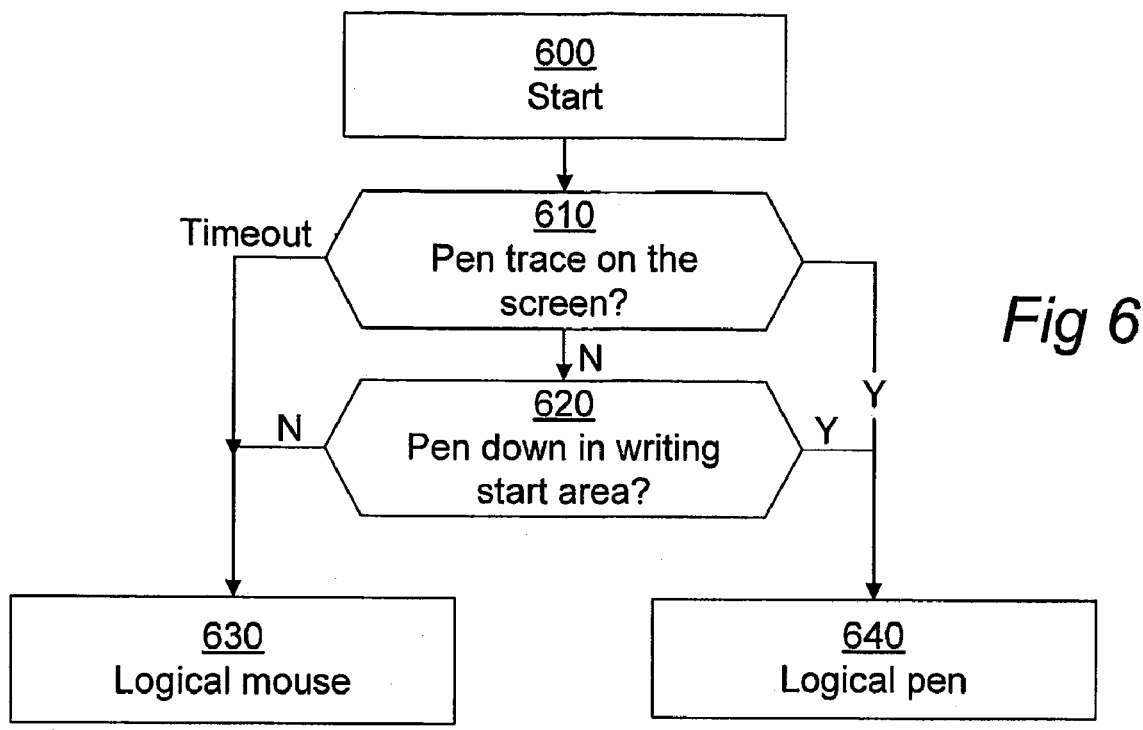
FIG. 6 represents an embodiment of the invention for discriminating between logical mouse mode and logical pen mode in handwriting recognition.

FIG. 6 illustrates one way to discriminate between logical mouse mode and logical pen mode. The embodiment reliably identifies the user's stylus input as a logical pen in the following cases:

When there has already been at least one pen trace 252 in the handwriting input area 270 (step 610). This will allow input of a sequence of strokes that together are interpreted as a single symbol even if the strokes are non-continuous.

When there is no pen trace 252 in the handwriting input area 270 and the pen down event happens in the writing start area 280 (step 620). If the apparatus is already in logical pen mode, then the user input will be subjected to handwriting recognition. If the apparatus is in logical mouse mode, then the selected subarea 282-288 will be expanded and the apparatus will be prepared to handle a following user input as handwriting.

The case when the stylus will be considered as a logical mouse is:

When there is no pen trace 252 in the handwriting input area 270 and the pen down event happens outside of the writing start area 280 (step 630).

Figure 3:
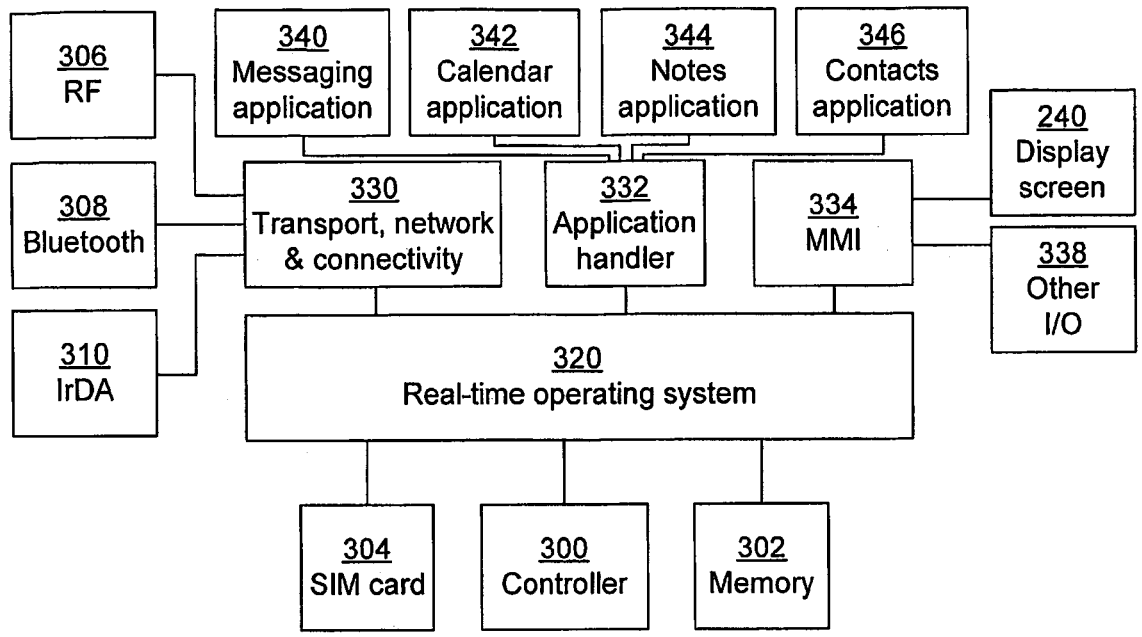
FIG. 3 is a schematic block diagram of the hardware and software structure of the mobile terminal of FIGS. 1 and 2a-g.
Figure 4:
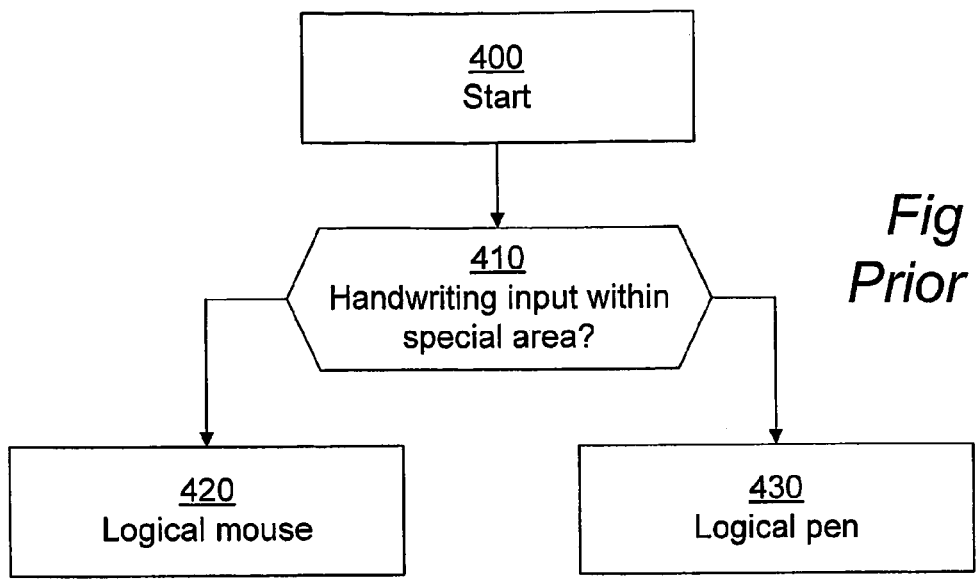
FIGS. 4 and 5 represent prior art methods of discriminating between logical mouse mode and logical pen mode in handwriting recognition.
Figure 5:
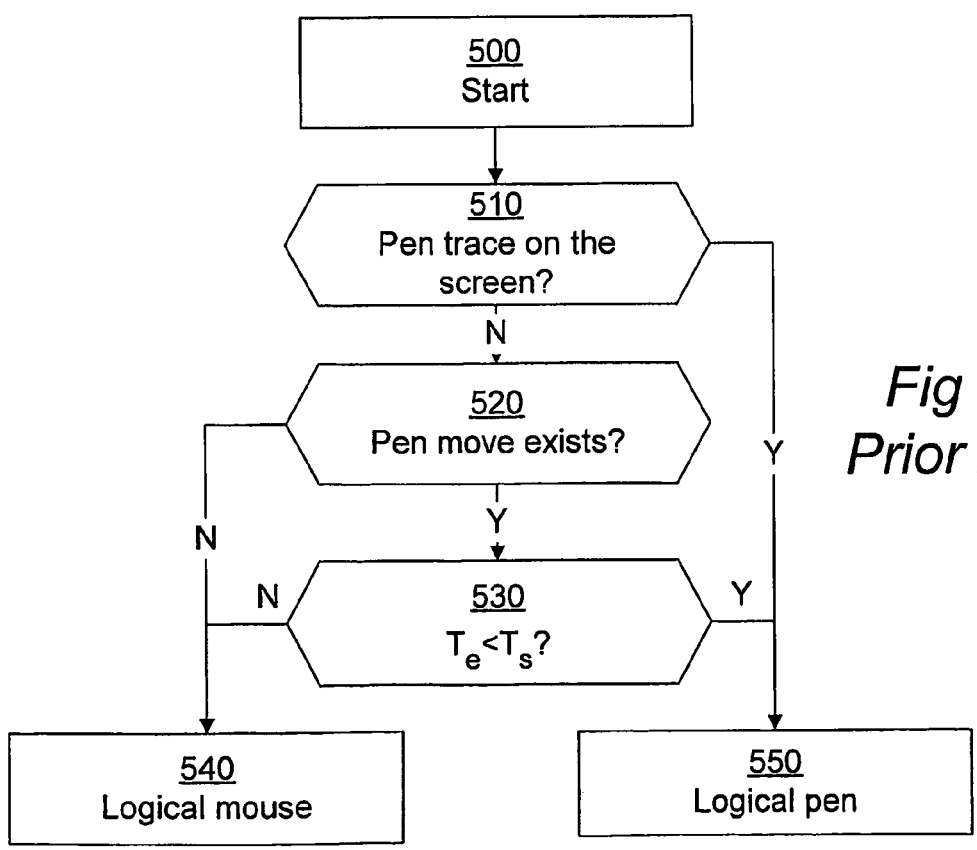

FIG. 3 illustrates the internal structure of the apparatus 100. A controller 300 is responsible for the overall operation of the apparatus and is preferably implemented by any commercially available CPU ("Central Processing Unit"), DSP ("Digital Signal Processor") or any other-electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the portable communication apparatus. The software includes a real-time operating system 320, man-machine interface (MMI) drivers 334, an application handler 332 as well as various applications. The applications include a messaging application 340, a calendar application 342, a notes application 344 and a contacts application 346, as well as various other applications which are not referred to herein. The MMI drivers 334 cooperate with various MMI or input/output (I/O) devices, including the display screen 240 and other input/output devices 338 such as a camera, a keypad, the microphone 232, the speaker 230, a vibrator, a joystick, a ringtone generator, an LED indicator, etc. As is commonly known, a user may operate the apparatus through the man-machine interface thus formed.

The handwriting recognition engine may be included in said set of MMI drivers 334 or may be provided as separate software executable by the controller 300. A large variety of existing handwriting recognition algorithms and products, software-based and/or hardware-based, may be used to implement the handwriting-recognition engine, as is readily realized by the skilled person.

The software also includes various modules, protocol stacks, drivers, etc., which are commonly designated as 330 and which provide communication services (such as transport, network and connectivity) for an RF interface 306, a Bluetooth interface 308 and an IrDA interface 310. The RF interface 306 comprises an internal or external antenna as well as appropriate radio circuitry for establishing and maintaining a wireless link to a base station (e.g. link 102 to base station 104 in FIG. 1). As is well known to a man skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

The apparatus 100 also has a SIM card 304 and an associated reader. As is commonly known, the SIM card 304 comprises a processor as well as local work and data memory.

The handwriting input referred to above may be received and used for various purposes in a variety of applications, including aforesaid messaging, calendar, notes and contacts applications 340, 342, 344 and 346, as well as for instance an Internet browser application, a WWW browser application, a WAP browser application, a phonebook application, a camera application, an image recordal application, a video recordal application, an organizer application, a video game application, a calculator application, a voice memo application, an alarm clock application, a word processing application, a code memory application, a music player application, a media streaming application, and a control panel application, or any other application which uses at least one field for text, character or symbol input.

The writing start area 280 may be designed in many different ways. It may be divided into an arbitrary number of subareas (2, 3, 4 (as in FIG. 2a), 5, 6, . . . ), each representing a respective symbol set as described above. It may however also consist of only one area, representing either a particular symbol set or a single general symbol collection (in applications where it is not necessary to divide the available symbols into different sets).

Moreover, the writing start area 280 may have a fixed location on the display screen (as shown in FIGS. 2a-g) or an adaptive. If the writing start area 280 has a fixed location, in may in some embodiments be included in a status or menu bar which also includes status information such as battery level, RSSI (Received Signal Strength Indicator), date, time, application name, document name, number of characters in a document, etc, and/or selectable menus.

If the writing start area 280 has an adaptive location, its location may for instance follow the current cursor position, so that the writing start area will always be conveniently near the screen position where the user input takes place.

The writing start area 280 need not necessarily be designed as a horizontal bar but have other geometrical forms, for instance a vertical bar, a circle or a square box. If the writing start area 280 is a square box and has subareas, such subareas may be positioned like quadrants in a coordinate system.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus comprising:
a touch-sensitive display screen providing a handwriting input area capable of detecting hand-made user input; and
a processing device providing a user interface to a user via the touch-sensitive display screen, wherein:
the handwriting input area includes a writing start area capable of switching between a first two-dimensional size and a second two-dimensional size, larger than the first two-dimensional size, wherein said writing start area is smaller than said handwriting input area; and in that
the processing device is configured to handle said hand-made user input as either a logical mouse event, associated with a control operation for said user interface, or a logical pen event, associated with handwriting;
wherein user input within the writing start area when having its first two-dimensional size is handled as a logical mouse event and causes the writing start area to switch to its second two-dimensional size;
wherein user input that starts within the writing start area when having its second two-dimensional size and ends anywhere within the handwriting input area including outside said writing start area is handled as a logical pen event and causes interpretation of the user input as a symbol from a plurality of predefined symbols, said plurality of predefined symbols including a first symbol set and a second symbol set, and said writing start area comprising a first subarea and a second subarea, each being capable of switching between a first two-dimensional size and a second two-dimensional size, larger than the first two-dimensional size;
wherein user input within either of said first subarea and second subarea, when having its respective first two-dimensional size, is handled as a logical mouse event and causes a switch to its second two-dimensional size;
wherein user input that starts within said first subarea, when having its second two-dimensional size, is handled as a logical pen event and causes interpretation of the user input as a symbol from said first symbol set;
wherein user input that starts within said second subarea, when having its second two-dimensional size, is handled as a logical pen event and causes interpretation of the user input as a symbol from said second symbol set; and
wherein the symbol from said first symbol set and the symbol from said second symbol set are combinable into a sequence of symbols.

2. An apparatus as in claim 1, said plurality of predefined symbols further comprising at least a third symbol set, and said writing start area further comprising at least a third subarea, the third subarea being capable of switching between a first two-dimensional size and a second two-dimensional size, larger than the first two-dimensional size,
wherein user input within any of said first subarea, second subarea and third subarea, when having its respective first two-dimensional size, is handled as a logical mouse event and causes a switch to its second two-dimensional size; and
wherein user input that starts within the third subarea, when having its second two-dimensional size, is handled as a logical pen event and causes interpretation of the user input as a symbol from said third symbol set.

3. An apparatus as in claim 1, wherein a switch to the second two-dimensional size for either of said first subarea or second subarea causes a switch for the other one of said first subarea or second subarea to its first two-dimensional size, if not already having it, so that only one of said first and second subareas can have its second two-dimensional size at any given time.

4. An apparatus as in claim 1, wherein the processing device is configured to provide a visual indication of said writing start area on said display screen.

5. An apparatus as in claim 1, wherein said writing start area has a fixed location within said handwriting input area.

6. An apparatus as in claim 1, wherein said processing device is configured to adjust a location of the writing start area depending on a current cursor position.

7. An apparatus as in claim 1, wherein a location of the writing start area is adjustable by a user of the apparatus.

8. An apparatus as in claim 1, wherein said handwriting input area is formed by a majority of the display screen's available presentation area.

9. An apparatus as in claim 1, wherein said handwriting input area is formed by the entire display screen's available presentation area.

10. An apparatus as in claim 1, said user input including at least one pen stroke, wherein said processing device is configured to display, on said display screen, a graphical trace representing said at least one pen stroke prior to the interpretation thereof.

11. An apparatus as in claim 10, wherein said processing device is configured to display, on said display screen, said symbol when it has been interpreted from said at least one pen stroke.

12. An apparatus as in claim 1, wherein said plurality of predefined symbols includes a symbol set selected from the group consisting of: Latin characters, upper case characters, lower case characters, Arabic numerals, punctuation symbols, Cyrillic characters, Chinese characters, Japanese Kanji symbols, Japanese Hiragana characters and Japanese Katakana characters, and user-defined symbols.

13. An apparatus as in claim 1, in the form a mobile terminal for a mobile telecommunication system.

14. An apparatus as in claim 1, in the form of a portable/personal digital assistant (PDA).

15. A method comprising:
  providing, within a handwriting input area, a writing start area capable of switching between a first two-dimensional size and a second two-dimensional size, larger than the first two-dimensional size;
  wherein said writing start area is smaller than said handwriting input area;
  detecting user input within the writing start area;
  handling user input, when said writing start area has its first two-dimensional size, as a logical mouse event and in response switching the writing start area to its second two-dimensional size;
  handling said user input, when said writing start area has its second two-dimensional size and said user input starts within the writing start area and ends anywhere within the handwriting input area including outside said writing start area, as a logical pen event and in response interpreting said user input as a symbol from a plurality of predefined symbols, said plurality of predefined symbols including a first symbol set and a second symbol set, and said writing start area comprising a first subarea and a second subarea, each being capable of switching between a first two-dimensional size and a second two-dimensional size, larger than the first two-dimensional size;
  wherein user input within either of said first subarea and second subarea, when having its respective first two-dimensional size, is handled as a logical mouse event and causes a switch to its second two-dimensional size;
  wherein user input that starts within said first subarea, when having its second two-dimensional size, is handled as a logical pen event and causes interpretation of the user input as a symbol from said first symbol set;
  wherein user input that starts within said second subarea, when having its second two-dimensional size, is handled as a logical pen event and causes interpretation of the user input as a symbol from said second symbol set; and
  wherein the symbol from said first symbol set and the symbol from said second symbol set are combinable into a sequence of symbols.

16. A method as in claim 15, said plurality of predefined symbols further comprising at least a third symbol set, and said writing start area further comprising at least a third subarea, the third subarea being capable of switching between a first two-dimensional size and a second two-dimensional size, larger than the first two-dimensional size,
  wherein user input within any of said first subarea, second subarea and third subarea, when having its respective first two-dimensional size, is handled as a logical mouse event and causes a switch to its second two-dimensional size; and
  wherein user input that starts within said third subarea, when having its second two-dimensional size, is handled as a logical pen event and causes interpretation of the user input as a symbol from said third symbol set.

17. A method as in claim 15, wherein a switch to the second two-dimensional size for either of said first subarea or second subarea causes a switch for the other one of said first subarea or second subarea to its first two-dimensional size, if not already having it, so that only one of said first and second subareas can have its second two-dimensional size at any given time.

18. A method as in claim 15, comprising the further step of visually indicating said writing start area on said display screen.

19. A method as in claim 15, comprising the further step of adapting a location of said writing start area within said handwriting input area depending on a current cursor position.

20. A method as in claim 15, comprising the further step of adapting a location of said writing start area within said handwriting input area depending on a user setting.

21. A method as in claim 15, said user input including at least one pen stroke, the method comprising the further step of displaying, on said display screen, a graphical trace representing said at least one pen stroke prior to the interpretation thereof.

22. A method as in claim 21, comprising the further step of displaying, on said display screen, said symbol when it has been interpreted from said at least one pen stroke.

23. A method as in claim 15, wherein said plurality of predefined symbols includes a symbol set selected from the group consisting of: Latin characters, upper case characters, lower case characters, Arabic numerals, punctuation symbols, Cyrillic characters, Chinese characters, Japanese Kanji symbols, Japanese Hiragana characters and Japanese Katakana characters, and user-defined symbols.

* * * * *